United States Patent
Lai et al.

[11] Patent Number: 6,115,149
[45] Date of Patent: Sep. 5, 2000

[54] MOTOR-SPEED CONTROL APPARATUS FOR SCANNERS WITH A MOVABLE SCAN HEAD

[75] Inventors: Jiunn-Yiing Lai; Pao-Yuan Yeh, both of Taipei Hsien, Taiwan

[73] Assignee: Primax Electronics Ltd., Taipei Hsien, Taiwan

[21] Appl. No.: 09/062,273

[22] Filed: Apr. 17, 1998

[30] Foreign Application Priority Data

Mar. 3, 1998 [TW] Taiwan ................................. 87103038

[51] Int. Cl.$^7$ ...................................................... H04N 1/46
[52] U.S. Cl. ........................ 358/505; 358/497; 358/474; 358/444; 358/412; 318/696; 318/685
[58] Field of Search ..................................... 358/505, 412, 358/413, 497, 496, 471, 400, 404; 318/696, 685

[56] References Cited

U.S. PATENT DOCUMENTS 5,491,397  2/1996  Hirakawa ................................. 318/696

*Primary Examiner*—Cheukfan Lee
*Attorney, Agent, or Firm*—Thomas, Kayden, Horstemeyer & Risley

[57] ABSTRACT

A motor-speed control apparatus is provided for use on a scanner of the type having a movable scan head, such as a flatbed scanner, for the purpose of controlling the operation a stepper motor used to drive the CCD (charge coupled device) scan head of the scanner. In this motor-speed control apparatus, a Y data table is predetermined, which includes a number of Y data sets, each corresponding to one line in the lengthwise direction (i.e., the Y-axis direction) of the document being scanned. In operation of the scanner when the scan head is to be moved over the document, the manipulation on each pixel in the lengthwise direction is based on the predetermined values of the corresponding Y data set. This allows the scan head to move in a non-target area of the document (the area that is not to be scanned), and at a fixed speed when moving over the target area of the document (the area that is to be scanned). Further, the scan head is moved in a rapid mode back to the original standby position immediately after the scan over the target area of the document is completed. This allows the scanner to be operated more efficiently.

15 Claims, 2 Drawing Sheets

MOTOR-SPEED CONTROL APPARATUS FOR SCANNERS WITH A MOVABLE SCAN HEAD

CROSS-REFERENCE TO RELATED APPLICATION

This application claims the priority benefit of Taiwan application Serial No. 87103038, filed Mar. 3, 1998, the full disclosure of which is incorporated herein by reference.

BACKGROUND OF THE INVENTION

1. Field of the Invention

This invention relates to scanners, and more particularly, to a motor-speed control apparatus for use on a scanner of the type having a movable CCD (charge coupled device) scan head, for the purpose of controlling the operation of a stepper motor used to move the scan head in such a manner as to allow the scanner to perform the scanning process more efficiently.

2. Description of Related Art

A CCD (charge coupled device) is a semiconductor device with a grid of light-sensitive elements capable of converting light images into electrical signals. Fundamentally, the magnitude of the electrical signal generated by a CCD is proportional to the intensity of the light illuminated on the light-sensitive surface of the CCD. In practice, a number of CCD elements are arranged into an array to form a CCD module that can be used in a wide range of applications. For instance, the scan head of a scanner uses a CCD module to convert the light image of a document into electrical signals. A CCD scan head is typically composed of three CCD sensors, respectively used to detect the red (R), green (G), and blue (B) components of the reflected light from the document being scanned. The RGB signals generated by the CCD module can then be further processed to obtain the digital image of the scanned document. The three RGB sensors are activated by respective trigger signals during the scanning process.

Scanners typically come with various resolutions, such as 600 dpi (dot per inch), 300 dpi, and 200 dpi. The user can select a desired resolution from these options for the scanner to scan the document accordingly. A high-resolution digital image contains a greater number of pixels than a low-resolution image. Therefore, when a low resolution setting is specified by the user to display a high-resolution image, some pixels in the high-resolution image should be discarded. For example, 400 dpi to display an originally high-resolution image of 600 dpi, the 1st, 2nd, 3rd, 4th, 5th, and 6th pixels in the same line of the high-resolution image may be processed in such a manner that the 2nd and the 5th pixels are discarded, and only the 1st, 3rd, 4th, and 6th pixels are retained in the low-resolution version of the original image. In the case of setting a resolution of 200 dpi for the same 600 dpi image, the pixels may be processed in such a manner that the 2nd, 3rd, 5th, and 6th pixels are discarded and only the 1st and 4th are retained in the low-resolution version of the original image. One problem of lowering the resolution, however, is that some image details in the original high-resolution image are lost when it is displayed at a low resolution. It is therefore an important research topic in the industry of imaging technology to find ways to retain the details of the original high-resolution image as much as possible when the original is displayed at a lower resolution.

Conventionally, there are many solutions to the foregoing problems, which include a software method and a hardware method.

In the software method, a software program is used to determine which of the CCD elements in the scan head are to be activated based on the current resolution setting. These CCD elements are then activated in the prescribed manner during the scanning process. One drawback to this method, however, is that the involved software computation is relatively time-consuming, which makes the operation of the scanner process quite inefficient. Moreover, the software method does not allow the stepper motor used to drive the CCD scan head to maintain a fixed speed during the scanning process.

By the hardware method, a memory unit is used to store the originally obtained digital data of the scanned image. In the case that the scanned image is to be converted to a lower resolution version, the original data are processed to discard some pixels in the original image. One drawback to this method, however, is that its implementation requires a large amount of memory space since the original high-resolution image typically has a very large amount of data. For this reason, the hardware cost to implement this method is quite high and results in a scanner that is less competitive in the market. As a summary, the conventional methods for converting a high-resolution scanned image to a low-resolution version have the following disadvantages:

(1) First, in the software method, the scanning process is considerably inefficient due to the fact that a software computation process must be performed to determine which of the CCD elements in the scan head are to be activated during the scanning process.

(2) Second, in the software method, the stepper motor for moving the CCD scan head over the scanned document is unable to maintained a constant, fixed speed during the scanning process, which can vibrate the scanner and thus degrade the quality of the scanned image.

(3) Third, in the hardware method, the implementation cost is high due to the fact that a large amount of memory space is required to store the data of the originally obtained, high-resolution, scanned image.

(4) Fourth, since the amount of data of the original high-resolution image is quite large, a great deal of time is needed to process and transfer these data in the scanner, resulting in degradation of the operating efficiency of the scanner.

SUMMARY OF THE INVENTION

It is therefore an objective of the present invention to provide a motor-speed control apparatus for use on a scanner, which utilizes a Y data table which contains a number of predetermined Y data sets whose values are used to activated selected RGB sensors on the CCD scan head and also used to control the operation of the stepper motor used to move the scan head, thus allowing the scanning process to be more efficient and the stepper motor to constantly maintain at a fixed speed when scanning over the document.

It is another objective of the present invention to provide a motor-speed control apparatus for use on a scanner, which can allow the scan head to move in a rapid mode both during the time when moving over the non-target area of the scanned document and when returning to the original standby position after the scan is completed, thus allowing the scanner to be operated more efficiently.

In accordance with the foregoing and other objectives of the present invention, a new motor-speed control apparatus for use on a scanner is provided. The motor-speed control apparatus of the invention is provided for use on a scanner of the type having a movable scan head driven by a stepper motor for controlling the operation of the stepper motor to move the scan head. The motor-speed control apparatus comprises: a memory for storing a Y data table including a number of Y data sets, each Y data set being associated with one line in the scanned document and composed of a number of bits; a Y data register for receiving a corresponding Y data set from the memory in response to a read request signal applied to the memory; a motor-control logic circuit, coupled to the memory unit and the Y data register, for controlling the operation of the stepper motor in accordance with the value of the current Y data set stored in the Y data register; and a multiplexer, under control by a selection signal from the Y data register, for selecting between a rapid-speed excitation pulse signal and a fixed-speed excitation pulse signal, the multiplexer outputting the selected signal to the motor-control logic circuit. The motor-speed control apparatus of the invention further comprises multiplexer, which is under control by a selection signal from the Y data register, for selecting between a rapid-speed excitation pulse signal and a fixed-speed excitation pulse signal. The rapid-speed excitation pulse signal is greater in pulse rate than the fixed-speed excitation pulse signal, and the multiplexer outputs the selected signal to the motor-control logic circuit.

Each Y data set comprises a reset bit, whose value determines whether the stepper motor is to be reset to original standby position in a rapid mode, and a forward bit, whose value determines whether the stepper motor is to drive the scan head to move in a rapid mode. Each Y data set further comprises a pixel color word used to indicate whether and which of the color components of the associated pixel of the scanned image is to be discarded, and a discard bit used to indicate whether the color components selected by the pixel color word are to be utilized. The pixel color word comprises a red bit used to indicate whether the red component of the associated pixel in the scanned image is to be acquired or not, a green bit used to indicate whether the green component of the associated pixel in the scanned image is to be acquired or not, and a blue bit used to indicate whether the blue component of the associated pixel in the scanned image is to be acquired or not. The stepper motor is operated in such a manner that the number of rotated steps is equal to the number of 1s in the pixel color word. Alternatively, the invention can be implemented in such a manner that the number of rotated steps is equal to the number of 0s in the pixel color word.

In operation, the motor-control logic circuit will output and transfer a read request signal via the signal line to the memory unit so as to read one Y data set from the Y data table stored in the memory unit. The data of the Y data set are then transferred via the data bus to the Y data register, and substantially transferred from the Y data register to the motor-control logic circuit. Based on the value of the received Y data set, the motor-control logic circuit will produce and transfer a corresponding excitation pulse signal and a forward/backward control signal respectively via the signal lines to the phase generator. In response to these signals, the phase generator can control the motor driver to drive the stepper motor in the prescribed manner.

Moreover, the Y data register can generate a base timing, signal to serve as a selection signal to the multiplexer so as to control the multiplexer to select between a rapid-speed excitation pulse signal and a fixed-speed excitation pulse signal. The output of the multiplexer is transferred to the motor-control logic circuit for controlling the stepper motor in the optimal manner.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
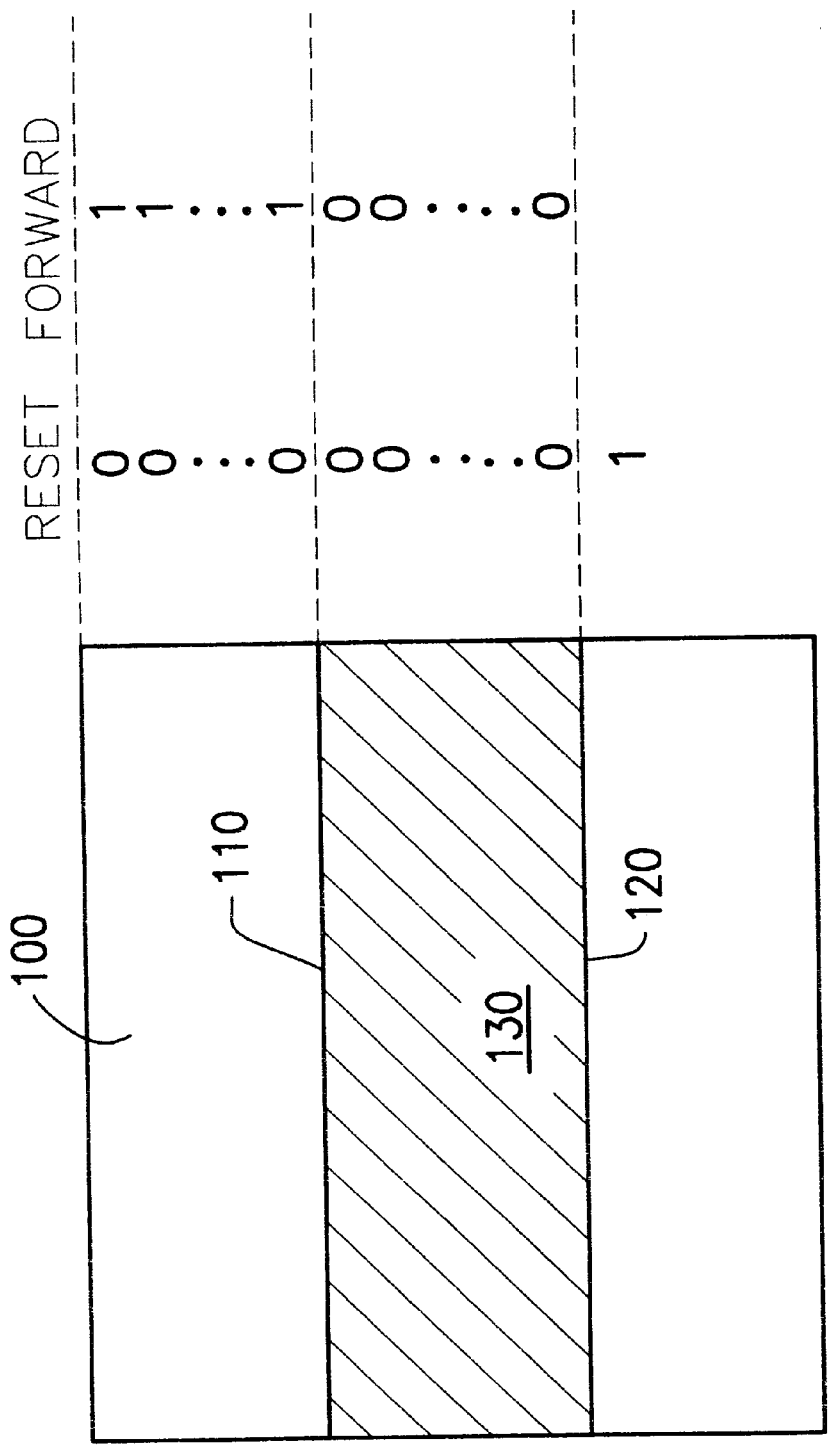
FIG. 1 is a schematic diagram used to depict the scanning of a document by a can head whose movements are controlled by a stepper motor controlled by the motor-speed control apparatus of the invention.

A CCD module used in a scanner is typically composed of three CCD sensors, and is used to respectively detect the red (R), green (G), and blue (B) components of the reflected light from the document being scanned. The RGB signals generated by the CCD module can then be further synthesized to obtain the digital image of the scanned document. In accordance with the invention, the three RGB sensors are activated in a predetermined manner during the scanning process, which will be described in detail in the following.

The following Table 1 shows the format of a 6-bit Y data set utilized by the motor-speed control apparatus invention for controlling the operation of a stepper motor used to move the CCD scan head of a scanner.

TABLE 1

| RESET | FORWARD | DISCARD | RED | GREEN | BLUE |
|---|---|---|---|---|---|
| $A_0$ | $A_1$ | $A_2$ | $A_3$ | $A_4$ | $A_5$ | where $A_0$ is the RESET bit whose value determines whether the scan head is to be returned to the original standby position;

$A_1$ is the FORWARD bit whose value determines whether the scan head is to be moved forwards in a rapid mode over the scanned document;

$A_2$ is the DISCARD bit used to indicate whether the RGB color information of the current pixel is to be discarded;

$A_3$ is the RED bit used to indicate whether the red sensor on the CCD scan head is to be activated so as to acquire the red color information of the current pixel;

$A_4$ is the GREEN bit used to indicate whether the green sensor on the CCD scan head is to be activated so as to acquire the green color information of the current pixel; and $A_5$ is the BLUE bit used to indicate whether the blue sensor on the CCD scan head is to be activated so as to acquire the blue color information of the current pixel.

The following Table 2 shows an example of the values of the bits $A_2$–$A_5$ and the significance thereof.

TABLE 2

| Bit Values | | | | Significance | |
| --- | --- | --- | --- | --- | --- |
| $A_2$ (DISCARD) | $A_3$ (RED) | $A_4$ (GREEN) | $A_5$ (BLUE) | Selected Colors | Motor Steps |
| 1 | 1 | 1 | 1 | R, G, B | 3 |
| 0 | 1 | 1 | 1 | None | 3 |
| 1 | 1 | 0 | 1 | R, B | 2 |
| 0 | 0 | 1 | 0 | None | 1 |

Table 2 shows that if $A_3=1$, the red sensor on the CCD scan head will be activated to acquire the data from the CCD scan head; otherwise, if $A_3=0$, the red sensor is deactivated. Similarly, if $A_4=1$, the green sensor on the CCD scan head will be activated to acquire the data from the CCD scan head; otherwise, if $A_4=0$, the green sensor is de-activated. If $A_5=1$, the blue sensor on the CCD scan head will be activated to acquire the data from the CCD scan head; otherwise, if $A_5=0$, the blue sensor is de-activated. The bits $A_3$, $A_4$, $A_5$ are collectively referred to as a pixel color word whose value determines which of the RGB sensors on the CCD scan head are to be activated.

The bit $A_2$ is termed the DISCARD bit, which is used to indicate whether the RGB color information of the current pixel is to be discarded or not. For example, as shown in Table 2 table, if $A_2=1$, the current pixel is to be retained and therefore its the pixel color word ($A_3$, $A_4$, $A_5$) is retained. Otherwise, if $A_2=0$, the current pixel is discarded.

Moreover, the value of the pixel color word ($A_3$, $A_4$, $A_5$) is also used to control the rotating steps of the stepper motor used to move the CCD scan head over the document being scanned. In the case of Table 2, for example, if the total number of 1s in the pixel color word ($A_3$, $A_4$, $A_5$) is 1, then the stepper motor will rotate by one step; if it is 2, the stepper motor will rotate by two steps; and if it is 3, the stepper motor will rotate by three steps. As a general rule, the stepper motor will rotate a sequence of steps equal in number to the total number of 1s in the pixel color word ($A_3$, $A_4$, $A_5$). Therefore, the stepper motor can be operated entirely based on the predetermined value of the Y data set without having to involve software computation each time a scan is to be performed. This allows the advantage of an increase in the operating efficiency of the scanner.

For each pixel, the operation of the CCD elements on the scan head is therefore dependent on the value of the Y data set. In practice, a Y data table can be predetermined based on each resolution setting. The Y data table contains a number of Y data sets, each corresponding to one pixel in the lengthwise direction (i.e., the Y-axis direction) of the document being scanned. In operation of the scanner when the scan head is to be moved over the document, the manipulation on each pixel in the lengthwise direction is based on the predetermined values of the corresponding Y data set in the Y data table. Since the values in the Y data table are already predetermined and stored in a memory unit, the computation as required by the prior art before performing each scan is unnecessary. The scanner that utilizes the invention can thus be operated more efficiently than the prior art. The provision of the Y data table is a characteristic part of the invention.

The first two bits $A_0$, $A_1$, in the Y data set are used to control the stepper motor when the scan head is not located over the target-area of the scanned document, which is defined as the area in the scanned document that is not to be scanned. FIG. 1 is a schematic diagram used to depict this operation. In FIG. 1, the reference numeral 100 designates the document that is to be scanned, and the shaded area indicated by the reference numeral 130 in the document 100 indicates the target area in the document 100 that is to be scanned. The area outside the target area 130 is referred to as non-target area. When the document 100 is placed in the scanner and is ready to be scanned, the CCD scan head is first moved by the stepper motor from its original standby position to the top edge 110 of the target area 130 in a rapid mode, and then the CCD scan head is moved line by line from the top edge 110 to the bottom edge 120 of the target area 130 in a fixed-speed mode. After this, the stepper motor is rotated in reverse so as to return the CCD scan head back to the original standby position in a rapid mode.

In the case of FIG. 1, for example, if $A_0=0$ and $A_1=1$, then the stepper motor will be operated in such a manner as to move the CCD scan head rapidly to the top edge 110 of the target area 130. Subsequently, at the top edge 110, since A1 is preset to 0, it causes the CCD scan head to move over the target area 130 line by line at a fixed speed from the top edge 110 to the bottom edge 120 of the bottom edge 120. When reaching the bottom edge 120, since $A_0$ is preset to 1, it causes the CCD scan head to be promptly moved in a rapid mode back to its original standby position. This completes the scan over the document 100. One advantage of this operation is that the CCD scan head can be returned to the original standby position immediately after reaching the bottom edge 120 of the target area 130 (i.e., immediately after the scan over the target area 130 is completed), without having to wait until reaching the bottom-most edge of the document 100. Completion of the scanning process can thus be quicker than the prior art. Starting from the top edge 110 of the target area 130, since both the two bits $A_0$, $A_1$ are preset to 0, the stepper motor is rotated constantly at a fixed speed, thus moving the CCD scan head to move line by line at a fixed speed over the target area 130 of the document 100.

Figure 2:
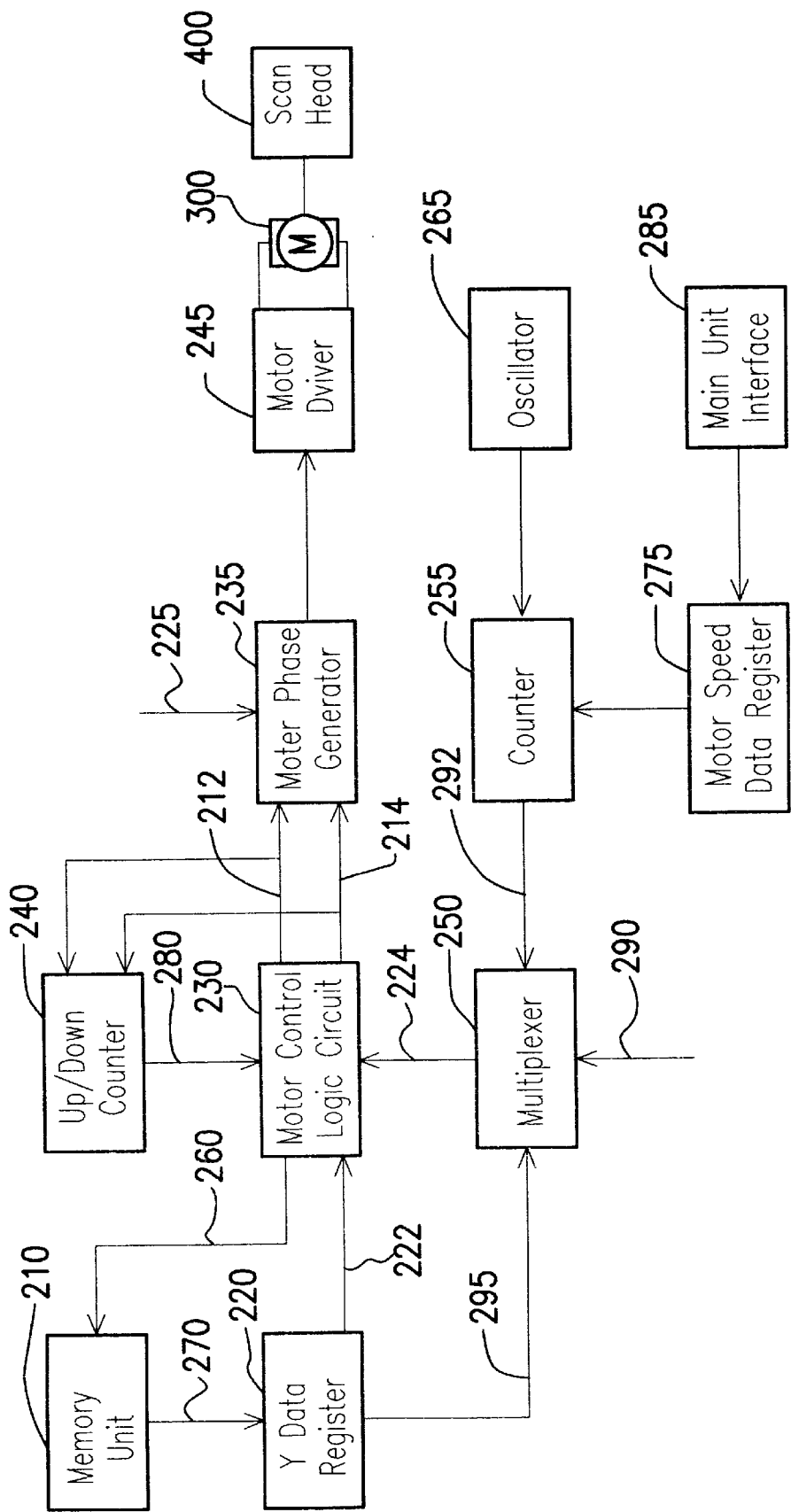
FIG. 2 is a schematic block diagram of the motor-speed control apparatus of the invention.

FIG. 2 is a schematic block diagram of the motor-speed control apparatus of the invention, which is devised to control the operation of a stepper motor 300 used to drive a CCD scan head 400 based on the Y data table mentioned above. As shown, the motor-speed control apparatus includes a memory unit 210, a Y data register 220, a motor-control logic circuit 230, an up/down counter 240, a multiplexer 250, a phase generator 235, a counter 255, a motor-speed data register 275, a motor driver 245, an oscillator 265, and a main unit interface 285. Referring also to FIG. 1, in the scanning process, the scanner is set at a low-resolution mode to perform a preliminary scan over the document 100 for the purpose of outlining the area that is to be actually scanned (i.e., the target area 130 shown in FIG. 1). When the actual resolution for the scanning process is set by the user, a software program will determine which pixels are to be discarded in the Y direction of the scanned image based on the current resolution setting, whereby the DISCARD bit values are determined and then written, along with the RESET and FORWARD data, into the Y data table. The resulting Y data table is then stored permanently in the memory unit 210.

In operation, the motor-control logic circuit 230 will output and transfer a read request signal via the signal line 260 to the memory unit 210 so as to read the corresponding Y data set from the Y data table stored in the memory unit 210 that is associated with the current pixel. The data of the Y data set are then transferred via the data bus 270 to the Y data register 220, and substantially transferred from the Y data register 220 to the motor-control logic circuit 230. Based on the value of the received Y data set, the motor-control logic circuit 230 will produce and transfer a corresponding stepping control signal and a forward/backward control signal respectively via the signal lines 212, 214 to the phase generator 235. In response to these signals, the phase generator 235 controls the motor driver 245 to drive the stepper motor 300 in the manner specified in the currently obtained Y data set.

It can be learned from Table 2 that, when the CCD scan head 400 is moving over the target area 130 of the document 100, the steps of the stepper motor are dependent on the state of the RGB sensors on the CCD scan head (i.e., whether they are activated or not). In other words, the speed of the stepper motor is related to the period of the excitation pulse signal applied to the stepper motor. Since the excitation pulse signal is related to the exposure time of the RGB sensors on the CCD scan head 400, the excitation pulse signal is large in period, typically 1 ms (millisecond). However, when the CCD scan head 400 is moving over the non-target area (i.e., the area other than and above the target area 130) in the document 100, it performs no scanning. The speed of the stepper motor is therefore not restricted by the excitation pulse signal, allowing the stepper motor to be driven by a short-period stepping control signal. This allows the CCD scan head 400 to move more rapidly than the prior art over the non-target area in the document 100.

Therefore, the multiplexer 250, which is coupled to the motor-control logic circuit 230, allows the user to externally set a desired motor speed and input via the signal line 290 to the multiplexer 250 (the excitation pulse signal on the signal line 290 is hereinafter referred to as a fixed-speed excitation pulse signal) The main unit interface 285, the motor-speed data register 275, the counter 255, and the oscillator 265 can work cooperatively to generate a short-period pulse train (hereinafter referred to as a rapid-speed excitation pulse signal), which is then transferred via the signal line 292 to the multiplexer 250. The multiplexer 250 obtains a base timing signal via the signal line 295 from the Y data register 220 to serve as a selection signal to the multiplexer 250, which selects between the rapid-speed excitation pulse signal on the signal line 292 and the fixed-speed excitation pulse signal on the signal line 290. The output of the multiplexer 250 is then transferred via the signal line 224 to the motor-control logic circuit 230, causing the motor-control logic circuit 230 to control the stepper motor 300 accordingly.

When the CCD scan head 400 performs a scanning process over the target area 130 of the document 100, the multiplexer 250 selects the fixed-speed excitation pulse signal on the signal line 290 as output, allowing the stepper motor 300 to move the CCD scan head 400 to move at a fixed speed when scanning over the target area 130 of the document 100. On the other hand, during the time when the CCD scan head 400 is moving forward from the original standby position to the top edge 110 of the target area 130 of the document 100 and when the CCD scan head 400 is moving back to the original standby position after the CCD scan head 400 has reached the bottom edge 120 of the target area 130, the multiplexer 250 selects the rapid-speed excitation pulse signal on the signal line 292 as output. Since the rapid-speed excitation pulse signal is higher in pulse rate than the fixed-speed excitation pulse signal on the signal line 290, the CCD scan head 400 moves more rapidly than when scanning over the target area 130 of the document 100. The selection signal to the multiplexer 250 is obtained from the Y data register 220, which allows the multiplexer 250 to select between the rapid-speed excitation pulse signal on the signal line 292 and the fixed-speed excitation pulse signal on the signal line and the multiplexer 250 then transfers the selected signal to the motor-control logic circuit 230 to be subsequently used to control the stepper motor 300.

The up/down counter 240 has two input ends respectively connected to the signal line 212 and the signal line 214 connected between the motor-control logic circuit 230 and the phase generator 235. The content of the up/down counter 240 is initially set to zero. When the stepper motor 300 is rotated in a the forward direction by one step so as to move the CCD scan head 400 forward by one step, the content of the up/down counter 240 is increased by one. However, when the stepper motor 300 is rotated in the reverse direction by one step so as to move the CCD scan head 400 backward by one step, the content of the up/down counter 240 is decreased by one. Whenever the content of the up/down counter 240 returns to zero, the up/down counter 240 outputs and transfers a stop signal via the signal line 280 to the motor-control logic circuit 230, causing the stepper motor 300 to stop operation.

The phase generator 235 receives the excitation pulse signal (which is either the rapid-speed excitation pulse signal or the fixed-speed excitation pulse signal) and the forward/backward control signal from the motor-control logic circuit 230 to thereby control the Motor driver 245 to drive the stepper motor 300 accordingly. The phase generator 235 can also receive an externally set half/full step signal via the signal line 225 so as to control the stepper motor 300 to rotate a half step or a full step each time.

In conclusion, the motor-speed control apparatus of the invention has the following advantages over the prior art.

(1) First, during the scanning process, whether the RGB sensors are activated or not is dependent on the preset values of the Y data set, which requires a reduced amount of memory space to implement and a reduced time in software computation to obtain the result. Moreover, it allows the CCD scan head to move at a fixed speed when scanning the document, so that the overall performance of the scanner is enhanced.

(2) Second, the invention utilizes the Y data set to control the speed and direction of the stepper motor, allowing the CCD scan head to be moved more rapidly during the time when moving over the non-target area of the document and during the time when moving back to the original standby position after the scan is completed. The scanner is therefore more efficient in performance.

The invention has been described using exemplary preferred embodiments. However, it is to be understood that the scope of the invention is not limited to the disclosed embodiments. On the contrary, it is intended to cover various modifications and similar arrangements. For example, the CCD module on the scan head can be replaced by a CIS module. The scope of the claims, therefore, should be accorded the broadest interpretation so as to encompass all such modifications and similar arrangements.

What is claimed is:

1. A motor-speed control apparatus for use on a scanner of the type having a movable scan head driven by a stepper motor for controlling the operation of the stepper motor used to move the scan head over a document, the motor-speed control apparatus comprising:

a memory unit for storing a Y data table including a number of Y data sets, each Y data set being associated with one line in the scanned document and composed of a number of bits used for driving the stepper motor;

a Y data register for receiving a corresponding Y data set from the memory unit in response to a read request signal applied to the memory;

a motor-control logic circuit, coupled to the memory unit and the Y data register, for controlling the operation of the stepper motor in accordance with the value of the current Y data set stored in the Y data register; and a multiplexer, under control by a selection signal from the Y data register, for selecting between a rapid-speed excitation pulse signal and a fixed-speed excitation pulse signal where the rapid-speed excitation pulse signal is greater in pulse rate than the fixed-speed excitation pulse signal, the multiplexer outputting the selected signal to the motor-control logic circuit.

2. The apparatus of claim 1, wherein each Y data set comprises:

a reset bit, whose value determines whether the stepper motor is to be reset to original standby position in a rapid mode; and a forward bit, whose value determines whether the stepper motor is to drive the scan head to move in a rapid mode.

3. The apparatus of claim 1, wherein each Y data set comprises:

a pixel color word used to indicate whether and which of the color components of the associated pixel of the scanned image is to be discarded; and a discard bit used to indicate whether the color components selected by the pixel color word are to be utilized.

4. The apparatus of claim 3, wherein the pixel color word comprises:

a red bit used to indicate whether the red component of the associated pixel in the scanned image is to be acquired or not;

a green bit used to indicate whether the green component of the associated pixel in the scanned image is to be acquired or not; and a blue bit used to indicate whether the blue component of the associated pixel in the scanned image is to be acquired or not.

5. The apparatus of claim 3, wherein the stepper motor is operated in such a manner that the number of rotated steps is equal to the number of 1s in the pixel color word.

6. The apparatus of claim 3 wherein the stepper motor is operated in such a manner that the number of rotated steps is equal to the number of 0s in the pixel color word.

7. The apparatus of claim 1, wherein the scan head comprises a CCD module.

8. A motor-speed control apparatus for use on a scanner of the type having a movable scan head driven by a stepper motor for controlling the operation of the stepper motor used to move the scan head over a document, the motor-speed control apparatus comprising:

a memory unit for storing a Y data table including a number of Y data sets, each Y data set being associated with one line in the scanned document and composed of a number of bits used for driving the stepper motor;

a Y data register for receiving a corresponding Y data set from the memory unit in response to a read request signal applied to the memory; and a motor-control logic circuit, coupled to the memory unit and the Y data register, for controlling the operation of the stepper motor in accordance with the value of the current Y data set stored in the Y data register.

9. The apparatus of claim 8, further comprising:

a multiplexer, under control by a selection signal from the Y data register, for selecting between a rapid-speed excitation pulse signal and a fixed-speed excitation pulse signal where the rapid-speed excitation pulse signal is greater in pulse rate than the fixed-speed excitation pulse signal, the multiplexer outputting the selected signal to the motor-control logic circuit.

10. The apparatus of claim 8, wherein each Y data set comprises:

a reset bit, whose value determines whether the stepper motor is to be reset to original standby position in a rapid mode; and a forward bit, whose value determines whether the stepper motor is to drive the scan head to move in a rapid mode.

11. The apparatus of claim 8, wherein each Y data set comprises:

a pixel color word used to indicate whether and which of the color components of the associated pixel of the scanned image is to be discarded; and a discard bit used to indicate whether the color components selected by the pixel color word are to be utilized.

12. The apparatus of claim 11, wherein the pixel color word comprises:

a red bit used to indicate whether the red component of the associated pixel in the scanned image is to be acquired or not;

a green bit used to indicate whether the green component of the associated pixel in the scanned image is to be acquired or not; and a blue bit used to indicate whether the blue component of the associated pixel in the scanned image is to be acquired or not.

13. The apparatus of claim 11, wherein the stepper motor is operated in such a manner that the number of rotated steps is equal to the number of 1s in the pixel color word.

14. The apparatus of claim 11, wherein the stepper motor is operated in such a manner that the number of rotated steps is equal to the number of 0s in the pixel color word.

15. The apparatus of claim 8, further comprising:

a multiplexer, under control by a selection signal from the Y data register, for selecting between a rapid-speed excitation pulse signal and a fixed-speed excitation pulse signal where the rapid-speed excitation pulse signal is greater in pulse rate than the fixed-speed excitation pulse signal, the multiplexer outputting the selected signal to the motor-control logic circuit, wherein each Y data set comprises:

a reset bit, whose value determines whether the stepper motor is to be reset to original standby position in a rapid mode; and a forward bit, whose value determines whether the stepper motor is to drive the scan head to move in a rapid mode:

wherein the scan head comprises a CCD module.

* * * * *